Oct. 8, 1957 T. L. GOTTIER 2,809,285

ANTENNA DUPLEXING

Filed April 21, 1943

Thomas L. Gottier Inventor

By C. D. Tuska Attorney

United States Patent Office 2,809,285

Patented Oct. 8, 1957

2,809,285

ANTENNA DUPLEXING

Thomas L. Gottier, Princeton, N. J., assignor to Radio Corporation of America, a corporation of Delaware Application April 21, 1943, Serial No. 483,959

6 Claims. (Cl. 250—13)

My invention relates to antenna duplexing and particularly to the use of a single antenna for both transmission and reception in a pulse-echo distance measuring system.

The present invention is an improvement on a well known duplexing arrangement wherein the reflected signal passes from the antenna transmission line to the receiver through a quarter-wave line section employed for impedance inversion. A spark gap or gas tube which is provided at the receiver end of the quarter-wave line breaks down during the transmission of a radio pulse and short circuits that end of the quarter-wave line. The resulting high impedance at the other end of the quarter-wave line, which is located at the junction of the antenna transmission line and the transmitter transmission line, results in the attenuation of the portion of the transmitted pulse energy that unavoidably reaches the receiver. By the time the transmitted pulse reaches a reflecting object and is reflected to the antenna, the spark gap is no longer broken down, the end of the quarter-wave line at the said junction point now presents a low impedance, and the reflected pulses pass on to the receiver with minimum attenuation.

An object of the present invention is to provide an improved antenna duplexing circuit for the transmission and reception of radio pulses by means of a single antenna.

A further object of the invention is to provide in a radio pulse-echo system of the type utilizing the same antenna for transmission and reception an improved antenna duplexing connection for reducing to a minimum the amount of pulse energy transmitted directly from the transmitter to the receiver.

In a preferred embodiment of my invention the quarter-wave line section leading to the receiver is a line having a greater impedance than that of the line connecting the transmitter to the antenna. A second quarter-wave line section connects the first quarter-wave line to the transmission line leading to the receiver to provide proper line matching from antenna to receiver. The spark gap that breaks down during a pulse transmission is connected across a tuned line located at the junction of the two quarter-wave lines. As a result of the higher impedance of the two quarter-wave line sections between the transmitter and the receiver, there is increased attenuation of that portion of the transmitted pulse energy which unavoidably passes directly to the receiver.

Figure 1:
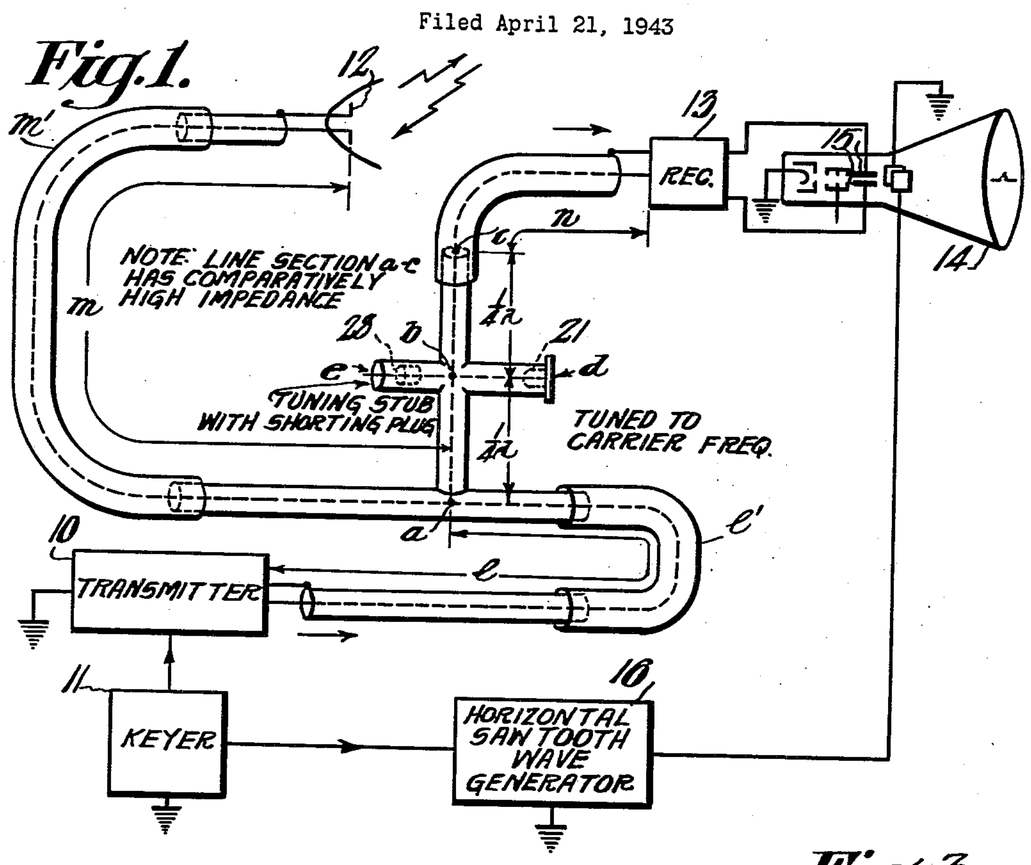
Figure 2:
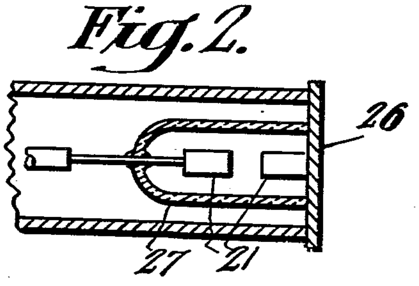
Figure 3:
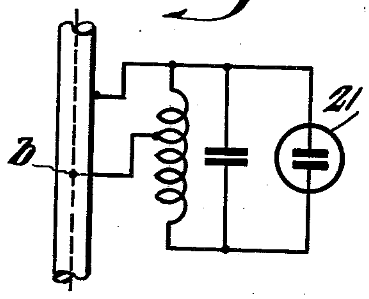

The invention will be better understood from the following description taken in connection with the accompanying drawing in which Figure 1 is a block and circuit diagram of a preferred embodiment of the invention; Figure 2 is a view of a spark gap utilized in the circuit of Fig. 1; and Figure 3 is a diagram of an equivalent circuit for a portion of the circuit shown in Fig. 1. In the several figures, similar parts are indicated by similar reference characters.

Referring to the drawing, the invention is shown applied to a pulse-echo system comprising a radio transmitter 10 which is pulsed at a periodic rate by a suitable keyer 11 for radiating pulses from an antenna 12. The antenna 12 also receives the reflected pulses which are carried to a receiver 13 as hereinafter described. The receiver 13 applies the reflected pulses to a suitable indicator, such as a cathode ray tube 14, the reflected pulses being applied to a pair of vertical deflecting plates 15, for example. The cathode ray is swept along a horizontal time axis in synchronism with the pulse transmission by means of a sawtooth voltage wave supplied from a sawtooth wave generator 16.

The transmitter 10 is connected to the antenna 12 through a transmission line section *l* and a transmission line section *m*. The section *l* is the part of the line between the transmitter 10 and the point *a*, this point being the junction point of the lines from the transmitter 10, from the receiver 13 and from the antenna 12. The section *m* is the part of the line between the point *a* and the antenna 12.

The receiver 13 is connected to the antenna through a transmission line section *n*, a transmission line section *c*—*b* which is substantially one-quarter wave length long, a second transmission line section *a*—*b* which is substantially one-quarter wave length long, and the line section *m*. Preferably, the several line sections are coaxial conductors as indicated in the drawing. It will be understood that the quarter-wave lines may be any odd number of one-quarter wave lengths long.

In accordance with my invention the usual quarter-wave line *a*—*b* and the quarter-wave line *b*—*c* which I have added are designed to have greater impedance than the line sections *l*, *m* and *n*. The impedance of sections *a*—*b* and *b*—*c* may be increased by decreasing the diameter of the inner conductor, for example, the increase in impedance preferably being as large as possible without obtaining a corona discharge.

The receiver end of the quarter-wave section *a*—*b* has a spark gap 21 connected across it by means of a line section *e*—*d* which is tuned to the carrier wave frequency of the transmitter 10. The spark gap 21 preferably comprises a pair of spaced electrodes in a gas filled envelope. It may be a neon glow tube, for example, having a metal base section 26 to which one spark gap electrode is connected and to which a glass envelope 27 is sealed. The one spark gap electrode is connected to the outer conductor of the line section *e*—*d* through the metal base 26, and the other spark gap electrode is connected to the inner conductor of the section *e*—*d*.

The tuned line section *e*—*d* consists of the two sections *e*—*b* and *b*—*d*, the section *e*—*b* being comparatively short and having an adjustable shorting plug 28 for tuning the section *e*—*d*. The spark gap 21 and the tuned line *e*—*d* form a parallel resonant circuit connection, the lumped-circuit equivalent of which is shown in Fig. 3.

The line sections *l* and *m* are provided with the trombone sections *l′* and *m′* which are adjusted for tuning the transmitter 10 and for matching the impedances of the antenna 12 and the line section *m*.

In operation, when a pulse is transmitted there is enough energy fed to the spark gap 21 to break it down whereby a short circuit is put across the line at point *b* and the impedance at point *a* looking toward the receiver is high. Therefore, most of the pulse energy will be supplied to the antenna 12, but, since the spark gap is not a perfect short-circuit when it breaks down, some pulse energy will reach the receiver 13. However, the energy now reaching the receiver 13 must pass through the comparatively high impedance line sections *a*—*b* and *b*—*c* and will be attenuated accordingly. If, for example, the impedance of each quarter-wave section is made twice that of the line section *l* (and, therefore, twice the impedance that the section *a—b* would have in the usual design), the transmitted pulse energy reaching the receiver 13 will be reduced to about one-fourth the usual amount. It will be noted that the amount of transmitted signal reaching the receiver is the amount that would reach it with the usual design times the reciprocal of the square of the increase in the line section impedance since my improved design includes the quarter-wave section *b—c* in addition to the usual section *a—b*.

Considering now the action of the circuit when a reflected pulse is received, the spark gap 21 will no longer be broken down, the impedance at point *b* will be high because of the parallel resonance, and the impedance at point *a* looking toward the receiver 13 will be low. Because of the quarter-wave section *b—c*, the impedance at *c* looking toward the receiver 13 will be the same as at the point *a*. However, the impedance at point *a* looking toward the transmitter 10 is high because of the transmitter tuning. Thus, the reflected pulse will be conducted efficiently to the receiver.

I claim as my invention:

1. In a pulse-echo system, a single antenna for both transmission and reception, a transmission line, a radio pulse transmitter connected to said antenna through said transmission line for transmitting pulses, a second transmission line, a pulse receiver for receiving said pulses after reflection from a reflecting object, said receiver being connected through said second transmission line to said first transmission line, said second transmission line including a section substantially an odd number of one-quarter wave lengths long having one end connected to said first transmission line, means connected across the other end of said quarter-wave section for substantially short-circuiting said other end during the presence thereon of a transmitted radio pulse, and also including a second quarter-wave section having one end connected to said other end of the first quarter-wave section and having its other end connected to the portion of the second transmission line leading to the receiver, said quarter-wave sections having a characteristic impedance that is substantially greater than the characteristic impedance of the first transmission line.

2. The invention according to claim 1 wherein said short-circuiting means comprises a transmission line stub which is tuned to the carrier wave frequency of said transmitter and which further comprises a spark gap connected across said stub.

3. In a pulse-echo system, a single antenna for both transmission and reception, a transmission line having a certain characteristic impedance, a radio pulse transmitter connected to said antenna through said transmission line, a second transmission line comprising a section having substantially the same characteristic impedance as said first transmission line and further comprising two line sections each substantially an odd number of one-quarter wave lengths long, said quarter-wave sections having a characteristic impedance that is substantially greater than said first-mentioned characteristic impedance, a pulse receiver connected through said second transmission line to said first transmission line, one of said quarter-wave sections having one end connected to said first transmission line, and means connected across the other end of said one-quarter wave section for substantially short-circuiting said other end during the presence of a transmitted radio pulse thereon, said second quarter-wave section having one end connected to said other end of the first quarter-wave section and having its other end connected to the first-mentioned section of the second transmission line.

4. The invention according to claim 3 wherein the section of line between said transmitter and the junction point of said first and second transmission lines is tuned with the transmitter to present high impedance looking from said junction point toward the transmitter.

5. In a pulse system, a single antenna for both transmission and reception, a transmission line, a radio pulse transmitter connected to said antenna through said transmission line for transmitting pulses, a second transmission line, a pulse receiver for receiving pulses, said receiver being connected through said second transmission line to said first transmission line, said second transmission line including a section substantially an odd number of one-quarter wave lengths long having one end connected to said first transmission line, means connected across the other end of said quarter-wave section for substantially short-circuiting said other end during the presence thereon of a transmitted radio pulse, and also including a second quarter-wave section having one end connected to said other end of the first quarter-wave section and having its other end connected to the portion of the second transmission line leading to the receiver, said quarter-wave sections having a characteristic impedance that is substantially greater than the characteristic impedance of the first transmission line.

6. In combination, a transmitter, a receiver, a common antenna for said transmitter and receiver, a first transmission line leading from said transmitter to said antenna, a second transmission line having a high characteristic impedance section and a low characteristic impedance section connected between said first transmission line and said receiver, said high characteristic impedance section being connected between said first transmission line and said low characteristic impedance section and having a structural length equal to a half wavelength of the transmitter operating frequency, and a space discharge device connected across the mid-point of said high characteristic impedance section.

References Cited in the file of this patent

UNITED STATES PATENTS

| | | |
|---|---|---|
| 1,035,958 | Girardeau | Aug. 20, 1912 |
| 2,202,700 | Leeds | May 28, 1940 |
| 2,688,746 | Young et al. | Sept. 7, 1954 |
| 2,738,418 | Cooke et al. | Mar. 13, 1956 |
| 2,746,017 | Lawson | May 15, 1956 |

FOREIGN PATENTS

| | | |
|---|---|---|
| 21,640 | Great Britain | Oct. 8, 1904 |
| 358,917 | Great Britain | Oct. 14, 1931 |